(12) United States Patent
Liebman et al.

(10) Patent No.: US 7,375,804 B2
(45) Date of Patent: May 20, 2008

(54) SINGLE DETECTOR RECEIVER FOR MULTI-BEAM LADAR SYSTEMS

(75) Inventors: Lionel D. Liebman, Plano, TX (US); Stuart W. Flockencier, Cedar Hill, TX (US); Edward M. Flowers, Grand Prairie, TX (US); Don A. Larson, Kennedale, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 202 days.

(21) Appl. No.: 11/069,477

(22) Filed: Mar. 1, 2005

(65) Prior Publication Data

US 2006/0197936 A1 Sep. 7, 2006

(51) Int. Cl.
*G01C 3/08* (2006.01)
(52) U.S. Cl. .............. 356/5.01; 356/5.05; 398/43; 398/102
(58) Field of Classification Search ............... 356/5.01
See application file for complete search history.

(56) References Cited

U.S. PATENT DOCUMENTS

| | | | | |
|---|---|---|---|---|
| 4,849,644 | A * | 7/1989 | Mira et al. | 250/559.38 |
| 4,989,971 | A * | 2/1991 | McDonald | 356/73.1 |
| 6,661,502 | B1 * | 12/2003 | Jakobsen et al. | 356/73.1 |
| 6,920,261 | B2 * | 7/2005 | Inada et al. | 385/24 |
| 7,002,620 | B1 * | 2/2006 | Rutledge | 348/85 |
| 7,116,412 | B2 * | 10/2006 | Takahashi et al. | 356/138 |
| 2002/0109886 | A1 * | 8/2002 | Barbier et al. | 359/172 |
| 2002/0159030 | A1 * | 10/2002 | Frey et al. | 351/212 |
| 2003/0020985 | A1 * | 1/2003 | LaGasse et al. | 359/135 |
| 2003/0043696 | A1 * | 3/2003 | Vakoc | 367/149 |
| 2003/0076485 | A1 * | 4/2003 | Ruff et al. | 356/5.09 |
| 2003/0137645 | A1 * | 7/2003 | Fluckiger | 356/4.01 |
| 2003/0179367 | A1 * | 9/2003 | Jennings et al. | 356/141.5 |
| 2003/0215052 | A1 * | 11/2003 | Grodzins | 378/19 |
| 2004/0028418 | A1 * | 2/2004 | Kaplan et al. | 398/188 |
| 2004/0062475 | A1 * | 4/2004 | Popovich et al. | 385/27 |
| 2004/0100688 | A1 * | 5/2004 | Iizuka et al. | 359/341.41 |

* cited by examiner

*Primary Examiner*—Thomas H. Tarcza
*Assistant Examiner*—Timothy A. Brainard
(74) *Attorney, Agent, or Firm*—Williams, Morgan & Amerson, P.C.

(57) ABSTRACT

A LADAR apparatus and a method for use in receiving a LADAR signal are disclosed. The apparatus includes an optical pickup capable of picking up a plurality of optical signals; a timing synchronization reference; a time domain multiplexer capable of multiplexing the optical signals into a multiplexed optical signal relative to the timing synchronization reference; and an optical detector capable of detecting the multiplexed optical signal. The method include time domain multiplexing a plurality of LADAR signals into multiplexed LADAR signal; detecting the multiplexed LADAR signal; and demultiplexing the detected LADAR signal.

33 Claims, 8 Drawing Sheets

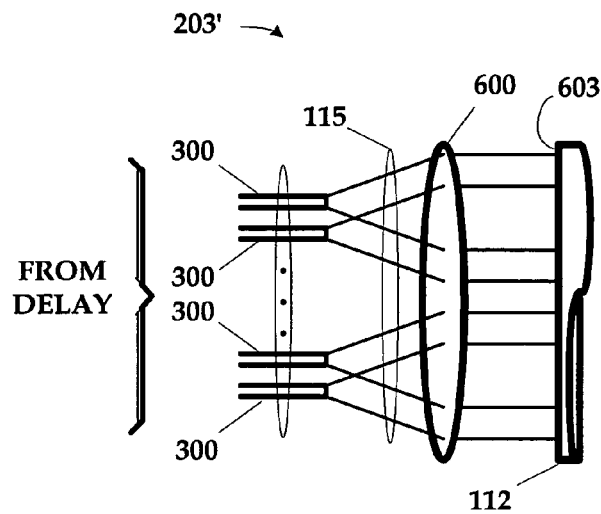
FIG. 6A
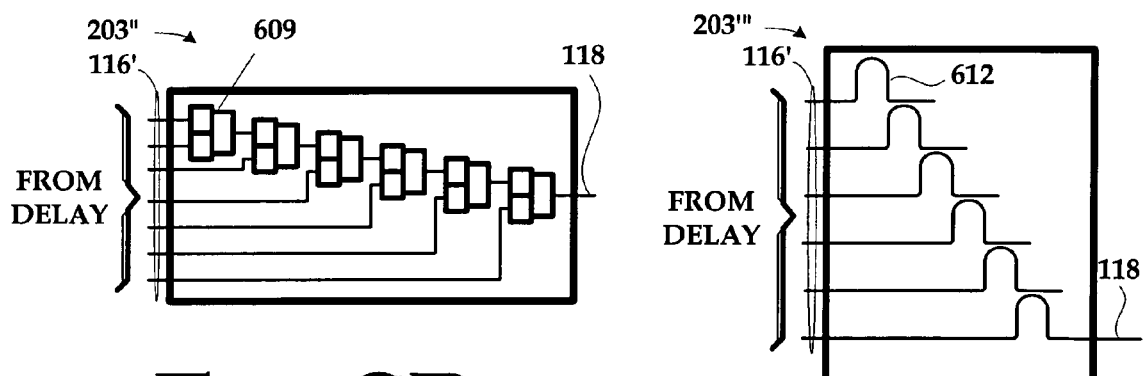
FIG. 6B
FIG. 6C

SINGLE DETECTOR RECEIVER FOR MULTI-BEAM LADAR SYSTEMS

BACKGROUND OF THE INVENTION

1. Field of the Invention

The present invention pertains to LADAR systems, and, more particularly, to a LADAR receiver for use in a multi-beam LADAR system.

2. Description of the Related Art

Many military and civilian applications rely on optical techniques such as laser detection and ranging ("LADAR"). At a very high level, LADAR works much like the more familiar radio wave detection and ranging ("RADAR"), in which radio waves are transmitted into the environment and reflected back, the reflections giving range and position information for the objects that generate them. LADAR does roughly the same thing, but using light rather than radio waves. Although there are some significant differences in performance, they are similar in at least this one basic respect.

Some LADAR systems employ a laser signal that is a pulsed, split-beam laser signal. That is, the LADAR transmitter transmits a laser signal in short bursts rather than continuously. The laser signal is often split into several spaced apart beamlets. Each pulse of the single beam is split, and so the laser signal transmitted is actually a series of grouped beamlets. The beamlets are then reflected to a LADAR receiver that picks up the reflected beamlets so that they can be detected, conditioned, and processed.

To actually detect the reflected laser signal, many LADAR transceivers use avalanche photodiodes ("APDs") because they are fast, high gain photo-multiplication devices. Although highly sensitive in the avalanche mode of operation, APDs can be unpredictable with non-linear and inconsistent responsivity between devices. These problems are exacerbated when APDs are used in multi-channel systems because their gain variation can make channel equalization difficult. Still further, the use of multiple APDs also means that the performance of the system as a whole hinges on the weakest APD, which statistically lowers performance. APDs are also expensive and their support electroncs can be complex. Since each detector requires duplication of electronics in a multi-channel receiver, reducing the required number of APDs is important to reducing overall cost and packaging volume in a multi-beam LADAR system.

The present invention is directed to resolving, or at least reducing, one or all of the problems mentioned above.

SUMMARY OF THE INVENTION

The invention includes, in its various aspects and embodiments, a LADAR apparatus and a method for use in receiving a LADAR signal. The apparatus includes an optical pickup capable of picking up a plurality of optical signals; a timing synchronization reference; a time domain multiplexer capable of multiplexing the optical signals into a multiplexed optical signal relative to the timing synchronization reference; and an optical detector capable of detecting the multiplexed optical signal. The method include time domain multiplexing a plurality of LADAR signals into multiplexed LADAR signal; detecting the multiplexed LADAR signal; and demultiplexing the detected LADAR signal. In other aspects, the invention includes analogous means for performing the recited functions.

BRIEF DESCRIPTION OF THE DRAWINGS

The invention may be understood by reference to the following description taken in conjunction with the accompanying drawings, in which like reference numerals identify like elements, and in which:

FIG. 6A-FIG. 6C conceptually illustrate alternative embodiments of the combiner in FIG. 2.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
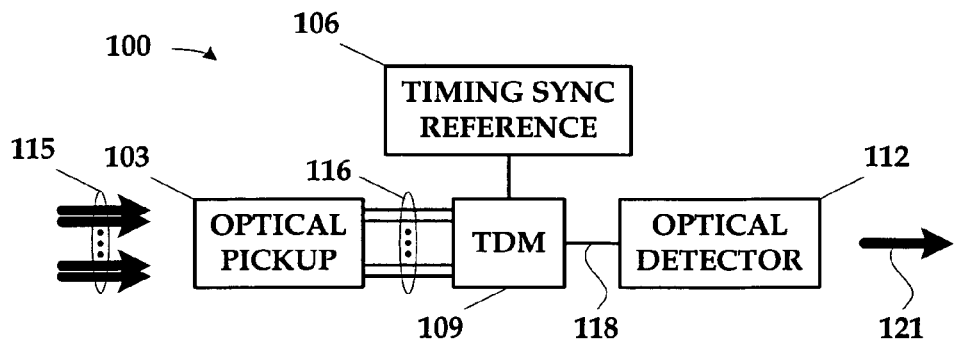
FIG. 1 conceptually illustrates in a block diagram an optical detection apparatus for use in a multi-beam LADAR system in accordance with the present invention.

FIG. 1 illustrates an optical detection apparatus 100 for use in a multi-beam LADAR system. The optical detection apparatus 100 comprises an optical pickup 103, a timing synchronization reference 106, a time domain multiplexer ("TDM") 109, and an optical detector 112. The optical pickup 103, in operation, picks up a plurality of optical signals 115. The optical signals 115 are, in the illustrated embodiment, reflections of a multi-beam LADAR signal, as will be described further below. Once picked-up, the optical signals 115 are transmitted through a plurality of channels 116, one channel 116 for each of the optical signals 115. The time domain multiplexer 109 then multiplexes the optical signals 115 into a multiplexed optical signal 118 relative to the timing synchronization reference 106. The optical detector 112 then detects the multiplexed optical signal 118 and, typically, converts it to an electrical signal 121.

Some aspects of the illustrated embodiment may be implemented in conventional fashion. For instance, the optical pickup 103 comprises a plurality of fibers (not shown), e.g., an array of optical fibers, although other techniques may be employed. Similarly, the timing synchronization reference 106 may comprise a backscatter reference (not shown) or a trigger signal (also not shown) for a laser (not shown) generating the LADAR signal. Similarly, the optical detector 112 may be implemented using an avalanche photodiode ("APD") such as are well known and commonly used in the art for this purpose.

Figure 2:
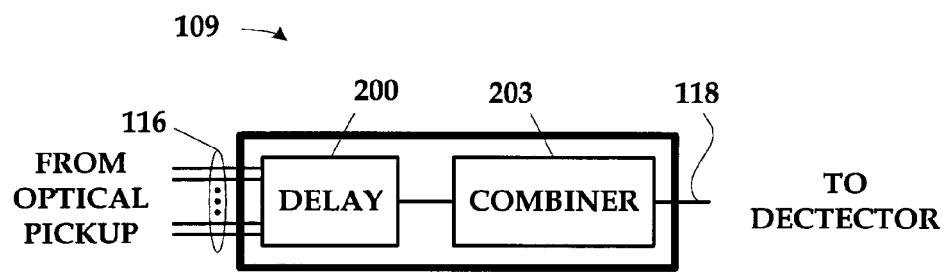
FIG. 2 is a block diagram of the time domain multiplexer of the optical detection apparatus of FIG. 1.

However, the time domain multiplexer 109 is implemented in accordance with the present invention. As is shown in FIG. 2, the time domain multiplexer 109 may include a delay 200 for each of the optical signals 115 and a combiner 203. More particularly, the delay 200 introduces a delay in the propagation of each channel 116. The combiner 203 combines the delayed optical signals 115 into the multiplexed signal 121, and the multiplexing is performed at a time measured relative to the timing synchronization reference 106. Since each of the optical signals 115 is delayed by a staggered amount, the information of interest they carry is likewise staggered. Consequently, when the optical signals 115 are combined, no information is overwritten. Because the time domain multiplexer 109 performs the multiplexing relative to the timing synchronization reference 106 and the delays are by known amounts, the capture electronics (not shown) can extract the information.

Figure 3A:
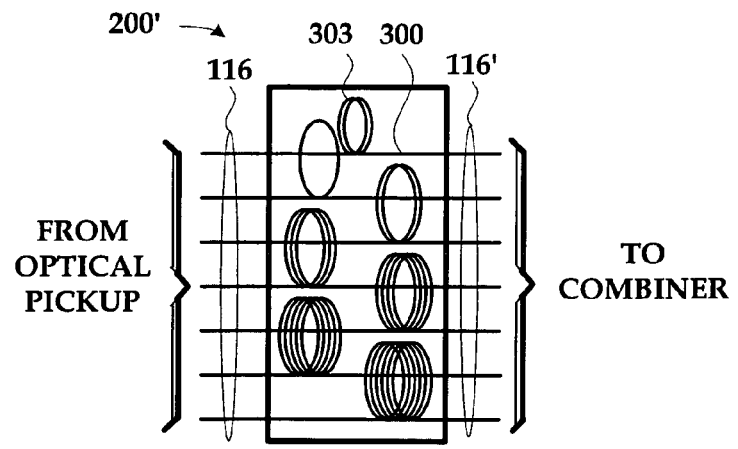
FIG. 3A-FIG. 3B conceptually illustrate two alternative embodiments of the delay in FIG. 2.
Figure 3B:
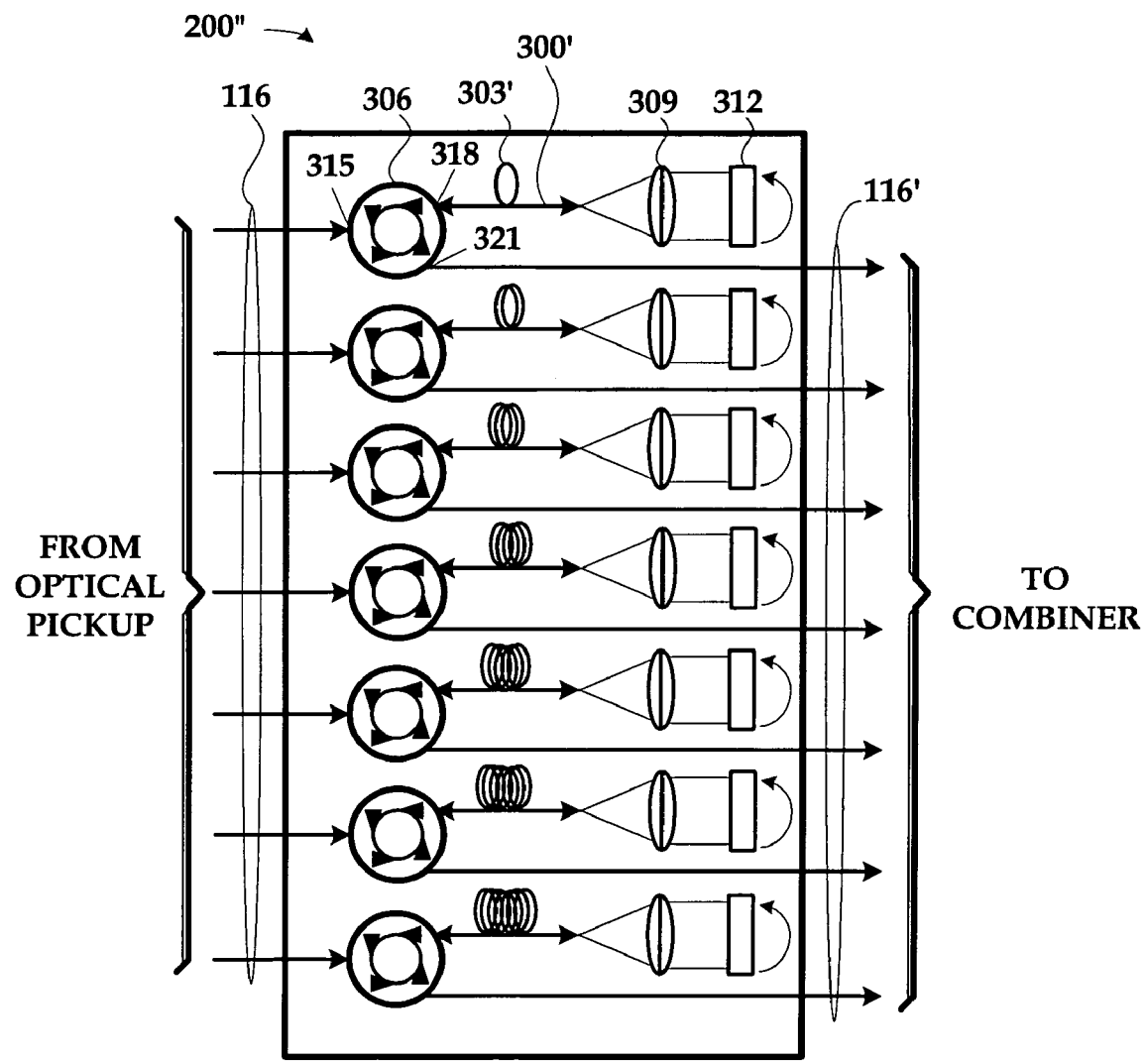

The invention admits variation in the manner in which the delay 200 may be introduced. Brute force techniques might include using mirrors or varying lengths of the channels 116 to lengthen the path of propagation, but more sophisticated techniques might be used. FIG. 3A-FIG. 3B depict two alternative implementations for the delay 200. Note that these two implementations are illustrative only, and that other embodiments of the delay 200 may be employed.

In FIG. 3A, a unique, staggered delay is introduced into each of the channels 116 by varying the lengths of the fibers 300 (only one indicated) defining the channels 116. For illustrative purposes, the delay 200' is shown for seven channels 116, although the number of channels 116 is not material to the practice of the invention. The varying length of the fibers 300 is conveyed by the varied number and size of the loops 303 (only one indicated) therein. Each loop 300, depending on its size, introduces a known delay into the channel 116 that is proportional to its length. Note that the geometry of the loops 303 is not what is important to the practice of the invention, but the length of the fiber 300. Thus, the extra length in the fibers 303 need not necessarily be formed or positioned into loops. Note also that, in variations of this embodiment, one of the channels 116 might not have any loops 303.

However, it may take relatively long lengths of the fiber 300 to introduce a significant enough delay given the speed at which the optical signals 115 will propagate. In some embodiments, design constraints may mitigate against long lengths of fiber 300. FIG. 3B illustrates a delay 200" that addresses this concern. In the delay 200", each of the channels 116 includes a fiber 300' (only one indicated) with one or more loops 303' (only one indicated) of varying number and size. However, each channel 116 also includes an optical circulator 306, a lens 309, and a mirror 312 (only one of each indicated).

The optical circulators 306 are three-port circulators. Each optical circulator 306 receives the respective optical signal 115 from the optical pickup 103, shown in FIG. 1, on one port 315. The optical circulator 306 then redirects the optical signal 115 through a second port 318 and to the lens 309 and mirror 312 over that part of the fiber 300' containing the loop(s) 303'. The lens 309 collimates the beam received from the optical pickup 103 over the channels 116 such that the beam retro-reflects off the mirror 312 and back to the fiber 300' with maximum coupling efficiency and fine attenuation resolution. The mirror 312 reflects the optical signals 115 back to the optical circulator 306 through the same length of the fiber 300' containing the loop(s) 303'. The optical circulator 306 then receives the reflected optical signal 115 on the second port 318 and redirects it to the combiner 203, shown in FIG. 2, through a third port 321. Because the optical signal 115 travels the length of the fiber 300' containing the loops 303' twice, this implementation essentially halves the amount of fiber 300' relative to the amount of fiber 300 in the delay 200' of FIG. 3A.

The amount of delay introduced into the channels 116 is not material to the practice of the invention. However, there are some timing constraints. As those in the art having the benefit of this disclosure will appreciate, the optical signals 115 typically will not be continuous because they typically will be pulsed. Or, if the optical signals 115 are continuous, the desired information will not be continuous, but will rather be pulsed. This is a function of how LADAR works. Note that an excess range variance may "push or overflow" a pulse into the wrong time bin. To reduce this risk, existing range data from various test flights could be analyzed to calculate an acceptable fiber-optic delay. Staggered delays will likely be on the order of 1-5 µsec/step. Extra attention may be desirable for LADAR at shallow depression angles due to the potential overflow of pulses into the wrong range bin.

In the alternate approach, for example, two detectors could support 8-channels with a 1500 meter range-gate at the present laser pulse rate. There would be four 10-microsecond bins spread across the period between laser firings. This would be accomplished with three fiber-optic spools of 10, 20 and 30 microseconds delay per detector. In the unlikely case that a return pulse exceeded the expected range-gate period, it would be "pushed" into the next channel's range bin. If this is a concern, a variable optical amplifier ("VOA") could be activated at the end of the period to block any outliers. Again the VOA must be somewhat fast acting, but it need not achieve as much attenuation as in the previous case. The penalty for using the absolute-method is the need for much longer fiber-optic delays and of course, more than one detector will be required in most applications. Its advantages are a) no VOA is necessarily needed and b) no activation pulse is required that might cause synchronization problems. A VOA can also be used as part of the AGC implementation although a slow-acting, low-attenuation device would be adequate in this application.

Figure 4:
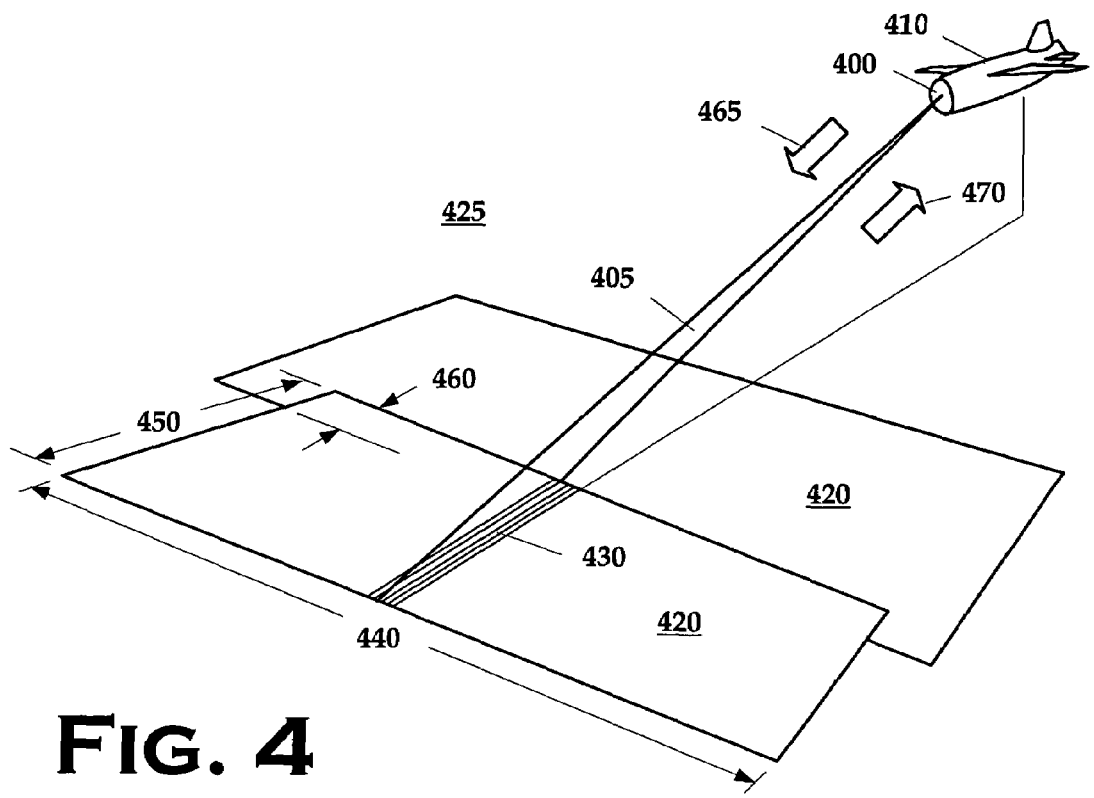
FIG. 4 depicts one particular embodiment of a LADAR system acquiring data about a field of view through an optics package aboard a platform shown therein, the optics package being constructed and operated in accordance with the present invention.

For example, FIG. 4 depicts one particular embodiment of a LADAR system in accordance with the present invention. This particular LADAR system is a multi-beam pulsed imaging system. A frame of image data is composed of groups (or nods) of scan lines formed from multiple beams with individual receiver channels. Every firing of the laser produces a set of scene pixels. Each of the receive data channels (plus a reference) has a separate fiber-coupled photo-detector to convert the optical return into an electrical pulse. Signal processing then extracts digital range and intensity values for each pixel. The laser firing also produces a large "backscatter" pulse that can overload the detectors.

This causes the detectors to go into saturation and then require a recovery period before returning to normal operation.

More particularly, the LADAR system acquires data about a field of view 425 through LADAR transceiver 400 aboard a platform 410. The LADAR transceiver includes a detection side comprising the optical detection apparatus 100 of FIG. 1. The LADAR transceiver 400 transmits the laser signal 405, as represented by the arrow 465, through the field of view 425. The platform 410 may be, for example, a reconnaissance drone or a flying submunition in the illustrated embodiment. In alternative embodiments, the platform 410 may be a ground vehicle, or a watercraft, or perhaps even a stationary post. There is no requirement that the platform 410 be a vehicle. The nature of the platform 410 in any given implementation is immaterial.

The LADAR transceiver 400 transmits the laser signal 405 using an acquisition technique described above is what is known as a "scanned" illumination technique. The laser signal 405 is typically a pulsed, split-beam laser signal. The LADAR transceiver 400 produces a pulsed (i.e., non-continuous) single beam that is then split into several beamlets spaced apart from one another by a predetermined amount. Each pulse of the single beam is split, and so the laser signal 405 transmitted during the elevational scan 450 in FIG. 4 is actually, in the illustrated embodiment, a series of grouped beamlets.

Suitable mechanisms for use in generation laser signal 405 are disclosed in:

U.S. Pat. No. 5,200,606, entitled "Laser Radar Scanning System," issued Apr. 6, 1993, to LTV Missiles and Electronics Group as assignee of the inventors Nicholas J. Krasutsky, et al.; and U.S. Pat. No. 5,224,109, entitled "Laser Radar Transceiver," issued Jun. 29, 1993, to LTV Missiles and Electronics Group as assignee of the inventors Nicholas J. Krasutsky, et al.

However, any suitable mechanism known to the art may be employed. Note that the detection side of the transceivers disclosed in the patents listed above are replaced by the present invention.

More technically, the LADAR transceiver 400 transmits the laser signal 405 to scan a geographical area called a "scan pattern" 420. Each scan pattern 420 is generated by scanning elevationally, or vertically, several times while scanning azimuthally, or horizontally, once within the field of view 425 for the platform 410. FIG. 4 illustrates a single elevational scan 430 during the azimuthal scan 440 for one scan pattern 420. Thus, each scan pattern 420 is defined by a plurality of elevational scans 450 such as the elevational scan 430 and the azimuthal scan 440. The principal difference between the successive scan patterns 420 is the location of the platform 410 at the start of the scanning process. An overlap 460 between the scan patterns 420 is determined by the velocity of the platform 410. The velocity, depression angle of the sensor with respect to the horizon, and total azimuth scan angle of the LADAR platform 410 determine the scan pattern 420 on the ground. Note that, if the platform 410 is relatively stationary, the overlap 460 may be complete, or nearly complete.

Thus, the LADAR system 400 transmits the pulsed laser signal 405 into field of view 425. Objects in the field of view 425 reflect the pulsed laser signal 405 back to the platform 410. The LADAR system 400 receives the reflected laser signal 405, which is actually a set of reflected beamlets since the transmitted laser signal comprises beamlets. It is this set of received beamlets that comprise the optical signals 115 in FIG. 1.

Still referring to FIG. 4, the estimated time of return for the reflected beamlets from the expected range can be obtained from an estimated flight time. The flight time can be estimated from factors such as the depression angle of transmission and platform velocity. The time at which each pulse of the laser signal 405 is fired is also known. From these pieces of information, a window in time is defined in which it can be expected that the optical signals 115 will arrive for detection. This kind of information is frequently used in LADAR systems for performing what is known as "range gating," and techniques for gauging these timing parameters are well known to the art. The window for detecting any given pulse of the laser signal 405 is, at the most, the period from the time at which the current pulse of beamlets arrives until the estimated arrival time for the next succeeding pulse. Typically, the window is defined to be much shorter based on the expected flight time, and the detection is gated to accommodate the window.

Figure 5:
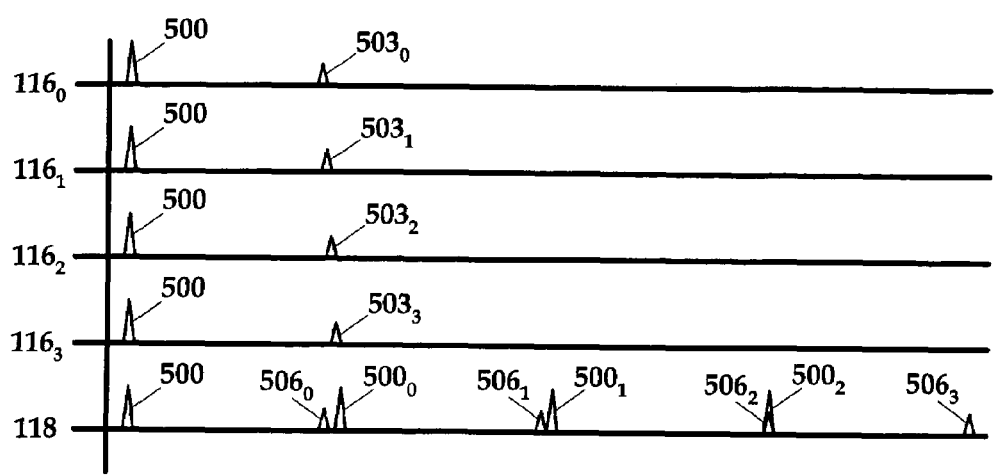
FIG. 5 illustrates selected timing parameters for the time domain multiplexing of the apparatus in FIG. 1.

FIG. 5 is a representative timing diagram for one particular embodiment. For LADAR applications, where the relative timing dispersion of the beamlet pulses is small, only short fiber delays are needed. The fiber delays will then be multiples of the maximum expected dispersion. The dispersion will be smallest for "steep" depression angle systems. Also, in this case, the occurrence of a particular pulse should be known to properly demultiplex the combined pulses. The maximum fiber delays occur when the group of beamlet pulses can individually occur anywhere within the system range gate period. The fiber delays will then be multiples of the range gate. In this case, the demultiplexing will be strictly based on the laser clock timing; no particular pulse dependency is required. Of course, long fibers have more cost, size and attenuation than with the short arrangement.

FIG. 5 illustrates some of these timing parameters in part for four channels $116_0$-$116_3$ and the multiplexed optical signal 118 in one particular embodiment. Note that FIG. 5 does not represent a complete picture of the conditioning of the optical detection apparatus 100 of FIG. 1. Note also that the illustrated timing parameters are implementation specific, and will vary in alternative embodiments.

The backscatter pulse 500, which is the timing synchronization reference 106 in this particular embodiment, is shown as having entered each of the channels $116_0$-$116_1$. Note that, in this particular embodiment, the backscatter pulse 500 should not be a "dropout" pulse in order to properly demultiplex the information during subsequent processing. Individual data pulses $503_0$-$503_3$, received via the optical pickup 103, are shown in the channels $116_0$-$116_3$. In the illustrated embodiment, the data pulses $503_0$-$503_3$ are separated by 0.1 μsec apiece. Thus, if the data pulse $503_0$ arrives at, for instance, 0.8 μsec, the data pulses $503_1$-$503_3$ arrive at 0.9, 1.0, and 1.1 μsec, respectively. Note that these numbers are representative only, and that arrival times will be implementation and context specific. The data pulses $503_0$-$503_3$ are then introduced to fiber optic delays, as described above, of 0.0, 1.0, 2.0, and 3.0 μsec, respectively. The expected maximum spread of the returned, data pulses $503_0$-$503_3$ about a specific range determines the minimum fiber optic step delay (1.0 μsec, here). Thus, anticipated platform operational scenarios should be considered so as to support, as well as determine, the assumptions on which the step delay is formulated.

A combined data pulse $506_0$, comprising the combined data pulses $503_0$-$503_3$ after the fiber optic delays, is shown in the multiplexed optical signal 118. Previous backscatter pulses $500_0$-$500_2$ are also shown in the multiplexed optical signal 118, as are previous composite data pulses $506_1$-$506_3$. The individual data pulses comprising the composite data pulses $506_1$-$506_3$ are not shown in the channels $116_0$-$116_3$ for the sake of clarity and so as not to obscure the present invention.

One of the channels, i.e., the channel $116_0$, has no fiber optic delay and thus be the first pulse in the received group to reach the detector. This first pulse will be used to initiate the demultiplexing sequence. A series of timing windows will then open to extract each pulse. Any pulse detected within a given window will be defined as originating from the corresponding optical channel. Multiple pulses within a window can be treated as they are now, as a function of the selected pulse-logic mode. Note that, if necessary to compensate for delay changes due to fiber-optic thermal expansion, a correction factor can be generated by a look-up-table in subsequent processing or by using a reference pulse for calibration.

Note that the intervening period between the backscatter pulses $500_0$-$500_2$ and the composite pulses $506_0$-$506_3$ is not constant, which results in a collision between the backscatter pulse $500_2$ and the composite pulse $506_2$. Such collisions result from fiber optic delays less that the maximum expected range delay unless the backscatter pulses 500, $500_0$-$500_2$ are blocked from entering the respective fibers. This, and many of the difficulties in these timing considerations, can be mitigated or eliminated if the fiber optic step delay is longer than the maximum expected range.

In this alternate method, if the inserted delay-step is increased to exceed the sensor's maximum absolute range-return, then the relative grouping is not a concern. Each channel is treated independently and no initiation-pulse is required. The time bins will be in fixed locations that are spread out between laser firings. In this case, the maximum number of data channels to be supported per detector is the laser-firing period divided by the maximum range-gate time. However, this would limit the number of channels per detector given the present assumptions regarding laser pulse rate ("LPR") and maximum range. Typically, two to four detectors would be required depending on this calculation and other considerations. Such an approach would also lead to more fiber optic attenuation and packaging problems, and more potential for pulse transmission effects (e.g., spreading, temperature, etc.).

The combiner 203, shown in FIG. 2, can multiplex the signals in any suitable manner known to the art. FIG. 6A-FIG. 6C conceptually illustrate three alternative embodiments 203'-203''' for implementing the combiner 203 in FIG. 2. Turning first to FIG. 6A, the combiner 203' comprises a lens 600 that focuses the optical signals 115 emerging from the fibers 300 of the channels $116_0$-$116_x$ onto the active surface 603 of the optical detector 112. The optical detector 112 then simultaneously detects all the energy from each of the channels $116_0$-$116_x$. The combiner 203'' is a tree coupler, in which a plurality of individual, 2-to-1 couplers 606 (only one designated) are used to ultimately combine all channels $116_0$-$116_x$ (seven are shown for purposes of illustration) into the combined signal 118. In FIG. 6C, the combiner 203''' comprises a plurality of cascaded tap couplers 612 (only one indicated).

In each of the cases shown in FIG. 6A-FIG. 6C, the information in each channel $116_0$-$116_x$ is delayed by a known amount. Furthermore, the delayed optical signal 115 of each channel $116_0$-$116_x$ is multiplexed into the combined signal 118 at a known time because it is done so relative to the timing and synchronization reference 106. Accordingly, the desired information can be combined in this manner without losing any of the information and in such a fashion that it can later be separated out. Note that, if desired, the last pulse (instead of the first pulse) to reach the detector can be used to initiate the demultiplexing sequence in alternative embodiments. In that case, the entire digitized pulse train would need to be stored prior to demultiplexing. For instance, the pulse train could be stored in the FGPA (not shown).

These alternative embodiments and other variations may be combined in a number of ways to produce a number of different designs. FIG. 7-FIG. 11 illustrate several alternative, particular implementations of LADAR receivers in accordance with the present invention. Note that each of these LADAR receivers could be used to implement the detection side of a LADAR transceiver (not shown). Indeed, each of the LADAR receivers in FIG. 7-FIG. 11 is intended for use in a gimbaled LADAR transceiver for use in a scanned illumination type of application as is illustrated in FIG. 4. Many of the embodiments in FIG. 7-FIG. 11 share common components, with like parts bearing like numbers.

Figure 7:
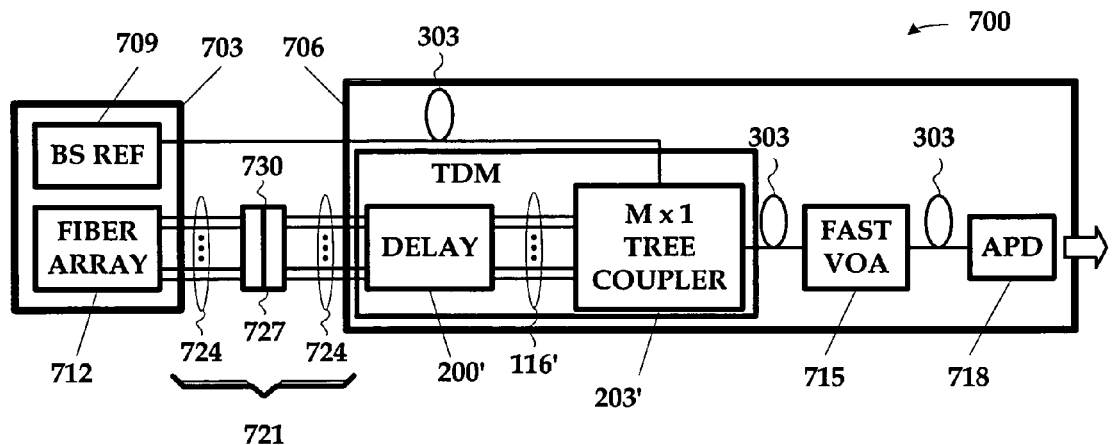
FIG. 7-FIG. 12 illustrate particular embodiments of LADAR receivers constructed in accordance with the present invention.

Turning now to FIG. 7, a LADAR receiver 700 is shown. The receiver 700 comprises an on-gimbal subassembly 703 and an off-gimbal subassembly 706. Note that whether any particular component is "off-gimbal" or "on-gimbal" is not material to the practice of the invention. The on-gimbal subassembly 703 includes:
  a back-scatter reference 709 implementing the timing and synchronization reference 106 of FIG. 1; and
  a fiber array 712 implementing the optical pickup 103 of FIG. 1.

The off-gimbal subassembly 706 includes:
  a delay 200', as shown in FIG. 3A;
  an m×1 tree coupler 203'', such as is shown in FIG. 6B;
  a fast variable optical attenuator ("VOA") 715 that controls the gain of the combined signal 118 and blocks backscatter; and
  an avalanche photodiode ("APD") 718 that implements the optical detector 112 of FIG. 1.

The on-gimbal subassembly 703 is optically connected to the off-gimbal assembly 706 by and optical connection 721 between the two. The optical connection 721 in this particular embodiment is implemented by optical fibers 724 and a pair of mated optical connectors 727.

More particularly, the back scatter reference 709 detects the firing of the laser (not shown) via, e.g., an APD (not shown). The back-scatter reference 709 signals the tree coupler 203'' over the optical line 730 of the firing so that the tree coupler 203'' can synchronize its operation to the operation of the rest of the transceiver. The fiber array 712 picks up the return pulses 115, shown in FIG. 1, and transmits them over the optical connection 721 to the off-gimbal subassembly 706.

The VOA 715 is a fast acting VOA to block the "backscatter" fire pulse from getting to the detector(s), i.e., the APD 718. This will occur with common transmit/receive aperture optics. With separate optics, a fast VOA may not be required. The VOA 715 is also not required to block the backscatter for the case of "long" fiber delays since there is no possibility of pulse/backscatter timing overlap. The VOA can be either in the transmit path, or the receive path, or both. However, in the illustrated embodiment, a fast-acting VOA is used to suppress the interference of multiple backscatter pulses on the data pulses when they are all combined at the detector. Ideally the VOA should attenuate the backscatter interference pulse to below the A/D threshold and then return to minimum attenuation in less than a microsecond. If such a VOA is impractical, then an alternate absolute scheme can be implemented wherein the inserted delay-step is increased to exceed the sensor's maximum absolute range-return.

In the off-gimbal subassembly 706, the optical connection 721 transmits the picked-up optical signals 115 to the delay 200', which introduces delay into the channels $116_0$- $116_x$ as illustrated in FIG. 3A and as discussed above. The delayed optical signals 115 then propagate through the channels $116_0$-$116_x$ to the tree coupler 203". The tree coupler 203" then combines the delayed optical signals 115 as shown in FIG. 6B and also as discussed above. The fast VOA 715 then controls the gain of the combined signal 118 output by the tree coupler 203" to prevent the APD 718 from being over- or under-saturated. The APD 718 detects the combined signal 118 and converts it into an electrical signal that can then be further conditioned and processed.

Figure 8:
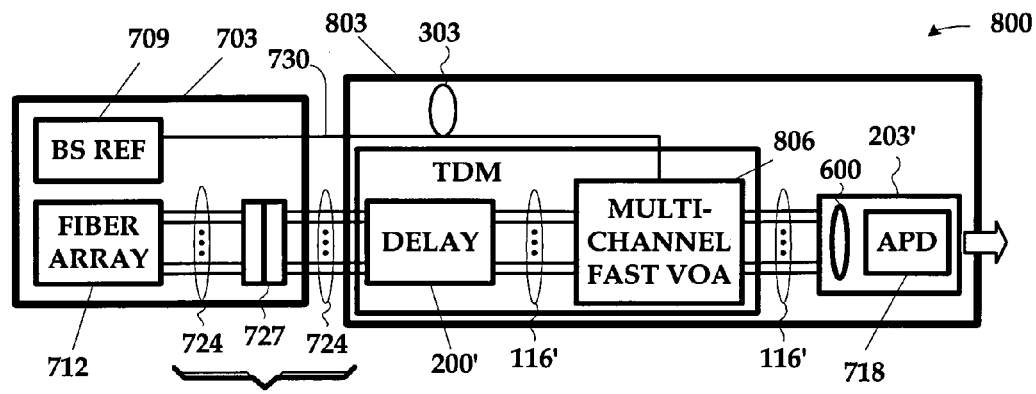

FIG. 8 illustrates an alternative LADAR receiver 800. The LADAR receiver 800 comprises an on-gimbal subassembly 703, first shown in FIG. 7 and discussed above, optically connected over an optical connection 721 to an off-gimbal subassembly 803. The off-gimbal subassembly 803, like the off-gimbal assembly 706 in FIG. 7, also employs a delay 200', as is shown in FIG. 3A. However, the off-gimbal subassembly 803 employs a combiner 203', such as is shown in FIG. 6A and as discussed above. However, because combination occurs at the APD 718, the single fast VOA 715 of FIG. 7 has been replaced by a multi-channel fast VOA 806.

Figure 9:
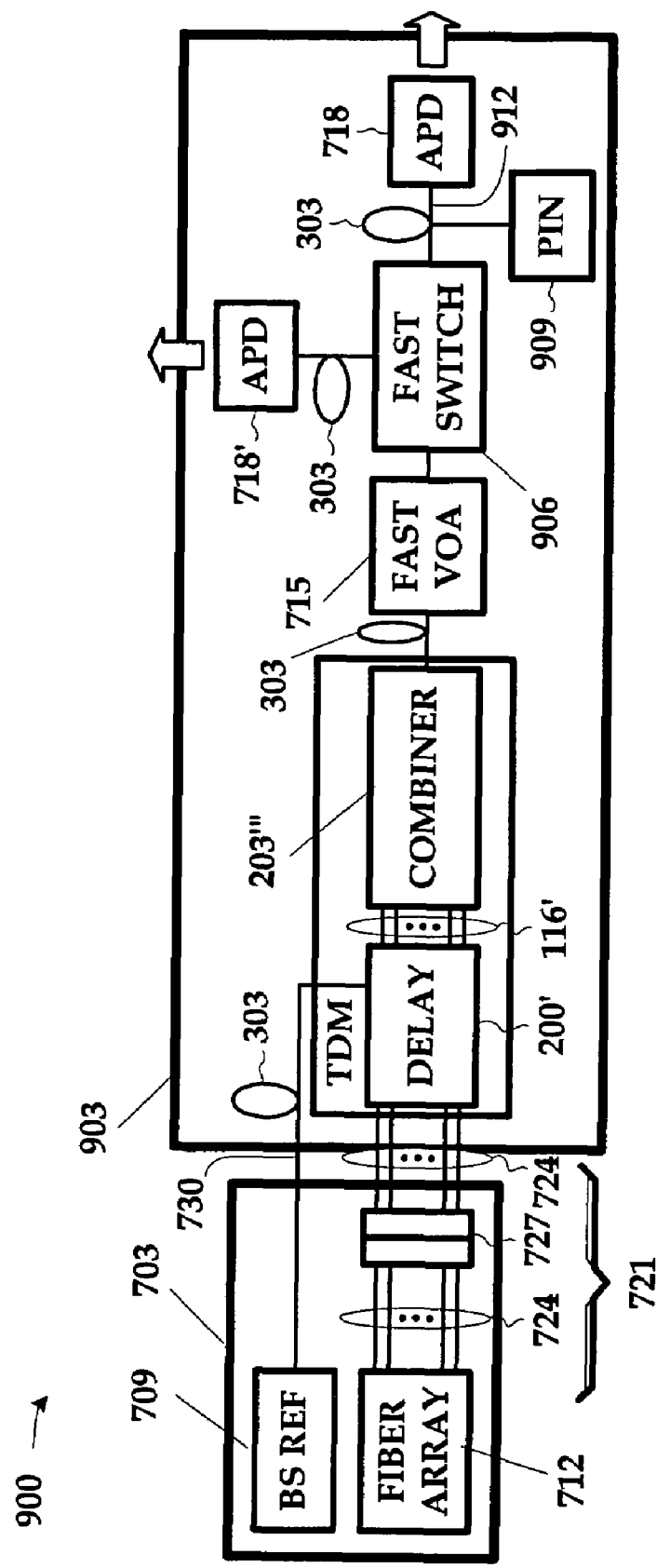

FIG. 9 illustrates an alternative LADAR receiver 900. The LADAR receiver 900 also comprises an on-gimbal subassembly 703, first shown in FIG. 7 and discussed above, optically connected over an optical connection 721 to an off-gimbal subassembly 903. However, the off-gimbal subassembly 903 employs a delay 200' and combiner 203''', conceptually illustrated in better detail in FIG. 6C. However, the LADAR receiver 900 also includes two optional features. First, the LADAR receiver 900 includes a fast switch 906 and a redundant optical detector, i.e., the APD 718' for situations in which the APD 718 becomes disabled or otherwise becomes inoperable. Second, the LADAR receiver 900 includes a reference detector, i.e., the PIN diode 909 that optically taps the line 912 for, e.g., closed loop automatic gain control, field calibration, or electronic optical counter counter measure ("EOCCM") purposes.

Figure 10:
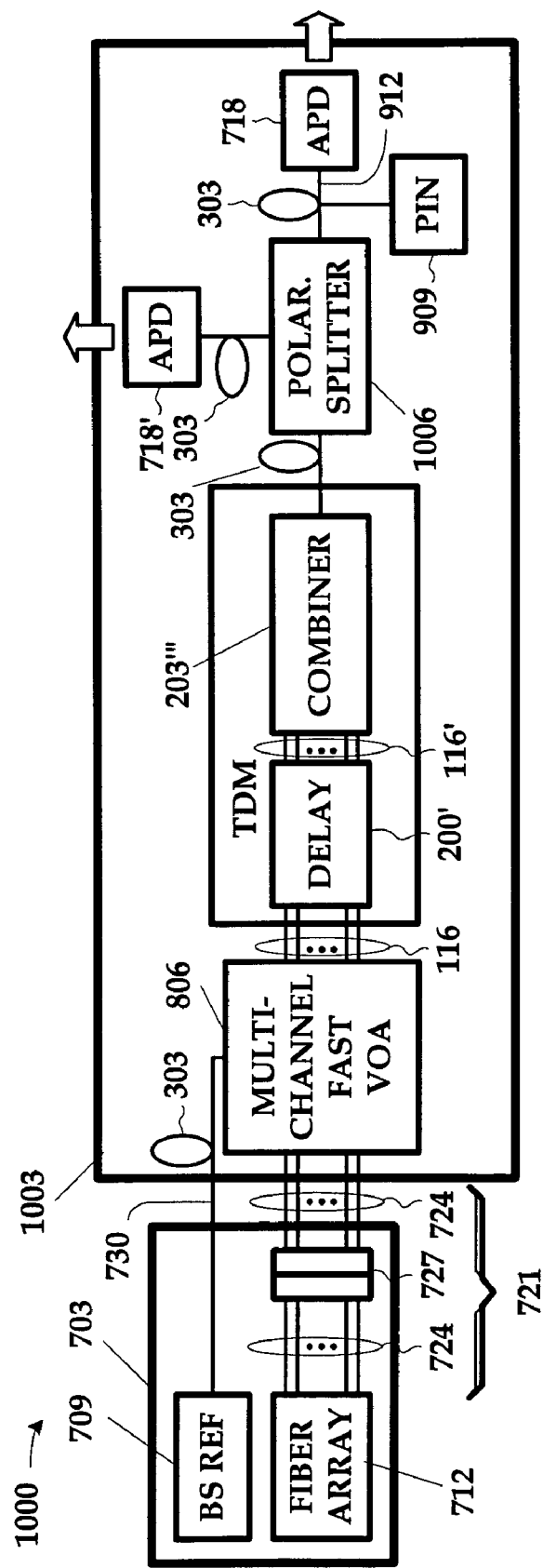

FIG. 10 illustrates a third alternative LADAR receiver 1000 comprising an on-gimbal subassembly 703, first shown in FIG. 7 and discussed above, optically connected over an optical connection 721 to an off-gimbal subassembly 1003. Note that the attenuation occurs before the delay, and so the fast VOA 715 has been replaced by a multi-channel fast VOA 806. Furthermore, the fast switch 906 in FIG. 9 has been replaced by a polarization splitter 1006 such that the second APD 718' may be used for a polarimetric LADAR. Note that the optical fibers in this embodiment should be polarization maintaining fibers.

Figure 11:
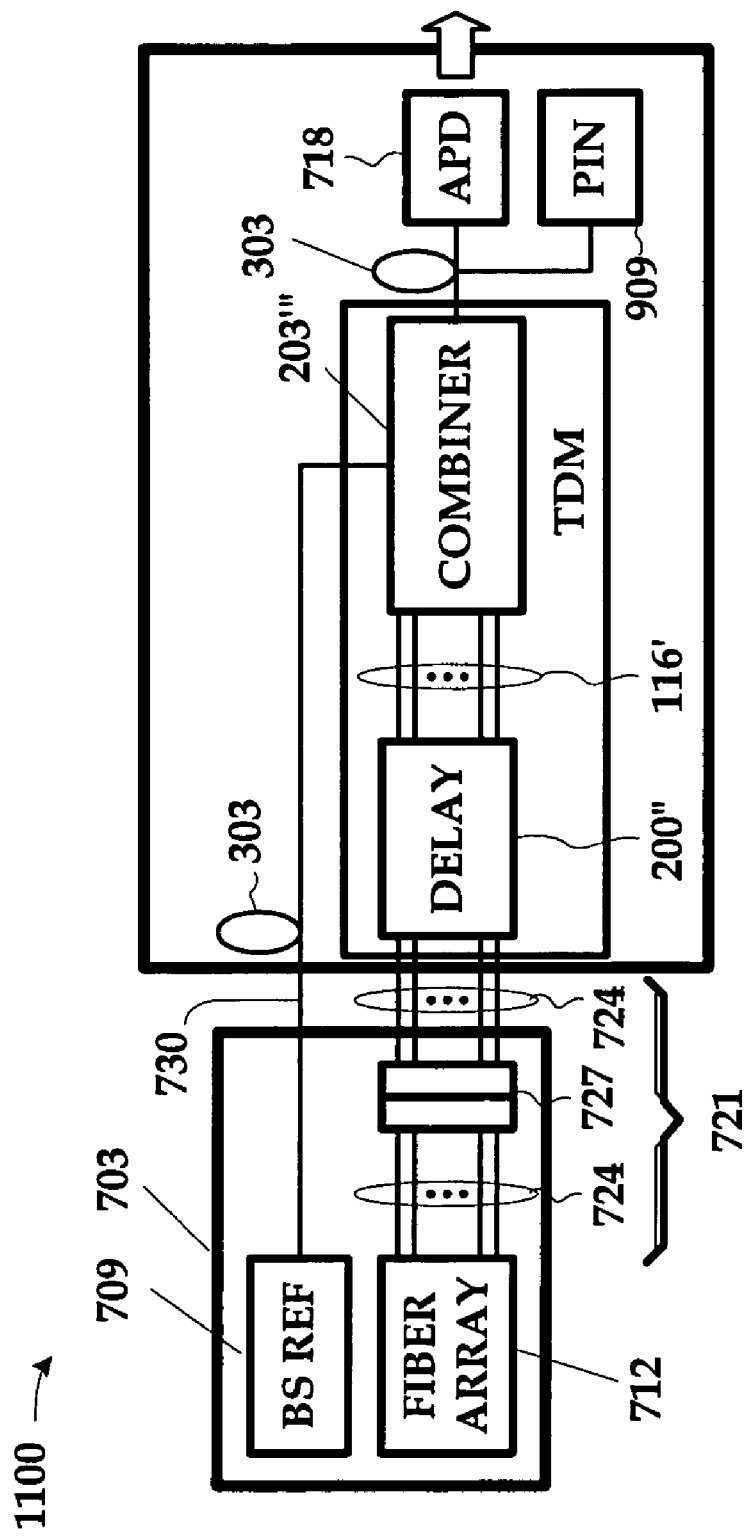

FIG. 11 illustrates a fourth alternative LADAR receiver 1100. The LADAR receiver 1100 also comprises an on-gimbal subassembly 703, first shown in FIG. 7 and discussed above, optically connected over an optical connection 721 to an off-gimbal subassembly 1103. Note that the off-gimbal subassembly 1103 does not include a second APD 718'. The off-gimbal subassembly 1103 also does not attenuate the optical signals, although variants could do so either before the delay 200" using a multi-channel VOA 715', as in the embodiment of FIG. 10, or after the delay 200" using a VOA 715, as in the embodiment of FIG. 9. Note also that the off-gimbal subassembly 1103 also employs the delay 203" rather than the delay 203'.

Thus, the present invention takes advantage that in an air-to-ground multi-beam LADAR system, each set of return pulses has a "tight" relative range grouping. The sensor depression angle produces a ground footprint that causes the return pulses to have "similar" range values. This new approach inserts a staggered amount of (fiber-optic) delay into each receive channel. These staggered optical delays will "spread out" a set of return pulses into separate (offset) time bins. The fixed delays will have been selected to assure that each bin is wide enough to account for the maximum expected range variances within each pixel set. The multiple fiber outputs are then applied to a single detector. Thus, the detector will "see" (for each laser firing) a series of compartmentalized pulses. The detector output will be digitized for further processing within a field-programmable-gate-array ("FPGA") in accordance with conventional practice. The pulse train will then be demultiplexed into individual pulses for analysis.

The major electronic advantage is the hardware reduction of eight or more channels into a single channel. This includes detectors, post amplifiers, AGC components and high-speed A/Ds. Also a reduced FPGA pin count will lead to a smaller, less costly package. A single-detector system will also eliminate all channel-to-channel component variances that would have occurred downstream of the detector inputs. Cross-coupling, layout and board noise issues will be greatly reduced. The electronics board would be universal; no redesign would be necessary to support any number of channels. Furthermore, since the detectors are inherently fragile, minimum usage will equate to higher system reliability. It may be more cost-effective to obtain a small number of high-quality detectors than a very large quantity of mediocre detectors. A reduction in board complexity will put less pressure on maintaining a compact detector size.

Figure 12:
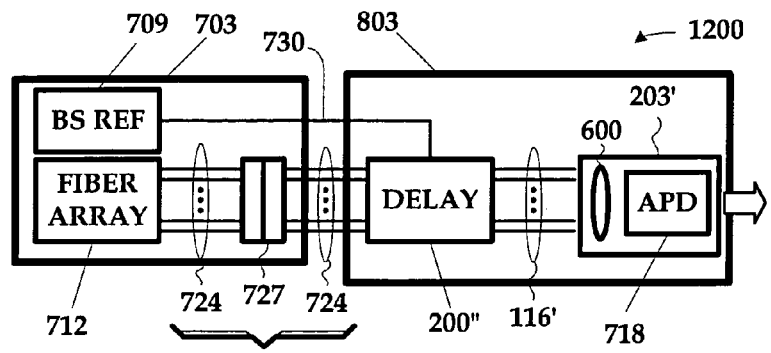

This concludes the detailed description. The particular embodiments disclosed above are illustrative only, as the invention may be modified and practiced in different but equivalent manners apparent to those skilled in the art having the benefit of the teachings herein. For instance, FIG. 12 illustrates another alternative embodiment 1200 arrived at by "mixing and matching" components previously described with reference to other embodiments. Furthermore, the present invention may be employed in construction site surveying and monitoring, autonomous vehicle navigation, danger environment control, manufacturing process control, and remote sensing. Also, if desired, the last pulse—instead of the first pulse—reaching the detector could be used to initiate the demultiplexing sequence, although, in that case, the entire digitized pulse-train would need to be stored within the FPGA. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   an optical pickup capable of picking up a split-beam LADAR signal comprising a plurality of optical signals;
   a timing synchronization reference;

a time domain multiplexer including:
    a delay for each of the optical signals, each delay being staggered and being measured relative to the timing synchronization reference, the delay including:
        varying lengths of optical fiber, each optical signal propagating through a unique length of fiber;
        a plurality of optical circulators, one for each of the optical signals, positioned at one end of the respective length of optical fiber; and
        a plurality of reflectors, one for each of the optical signals, positioned at the opposite end of the respective length of optical fiber; and
    a combiner capable of combining the delayed optical signals into the multiplexed signal; and
    an optical detector capable of detecting the multiplexed optical signal.

2. The apparatus of claim 1, wherein the optical pickup comprises a plurality of fibers.

3. The apparatus of claim 1, wherein the timing synchronization reference comprises a backscatter reference or a laser trigger signal.

4. The apparatus of claim 1, wherein the combiner comprises one of a tree coupler or a cascade of tap couplers.

5. The apparatus of claim 1, wherein the combiner comprises:
    the active surface of the optical detector; and
    a lens focusing the picked-up, delayed optical signals onto the active surface.

6. The apparatus of claim 1, further comprising a PIN detector tapping the multiplexed optical signal.

7. The apparatus of claim 1, further comprising:
    a second optical detector; and
    a switch or a polarization splitter through which the second optical detector receives the multiplexed optical signal.

8. The apparatus of claim 1, further comprising a variable optical attenuator.

9. The apparatus of claim 8, wherein the variable optical attenuator comprises a single channel variable optical attenuator capable of attenuating the multiplexed optical signal.

10. The apparatus of claim 8, wherein the variable optical attenuator comprises a multi-channel variable optical attenuator capable of individually attenuating the plurality of optical signals.

11. The apparatus of claim 1, wherein the optical detector comprises an avalanche photodiode.

12. An apparatus, comprising:
    means for picking up a plurality of optical signals;
    means for time domain multiplexing the optical signals, including:
        means for synchronizing the multiplexing;
        means for delaying each of the optical signals by a staggered amount measured relative to the synchronizing means; and
        means for combining the delayed optical signals into the multiplexed signal, including:
            varying lengths of optical fiber, each optical signal propagating through a unique length of fiber;
            a plurality of optical circulators, one for each of the optical signals, positioned at one end of the respective length of optical fiber; and
            a plurality of reflectors, one for each of the optical signals, positioned at the opposite end of the respective length of optical fiber; and
    means for detecting the multiplexed optical signal.

13. The apparatus of claim 12, wherein the combining means comprises one of a tree coupler or a cascade of tap couplers.

14. The apparatus of claim 12, wherein the combining means comprises:
    an active surface of the detecting means; and
    a lens focusing the picked-up, delayed optical signals onto the active surface.

15. The apparatus of claim 12, further comprising a PIN detector tapping the multiplexed optical signal.

16. The apparatus of claim 12, further comprising:
    second means for detecting the multiplexed optical signal; and
    means for directing the multiplexed optical signal to the second detecting means.

17. The apparatus of claim 16, wherein the directing means comprises a switch or a polarization splitter.

18. The apparatus of claim 12, further comprising a variable optical attenuator.

19. A method, comprising:
    receiving a plurality of LADAR signals;
    time domain multiplexing the received LADAR signals into a multiplexed LADAR signal, including:
        inserting a unique, staggered delay into each of the LADAR signals, including:
            inserting the delays includes propagating the received LADAR signals through varied lengths of optical fibers; and
            circulating the LADAR fibers through the optical fibers to a respective reflector and back through a lens; and
        combining the delayed LADAR signals;
    detecting the multiplexed LADAR signal; and
    demultiplexing the detected LADAR signal.

20. The method of claim 19, wherein combining the delayed LADAR signals includes combining them through one of a tree coupler or a cascade of tap couplers.

21. The method of claim 19, wherein the wherein combining the delayed LADAR signals includes focusing the delayed LADAR signals onto an active surface of an optical detector.

22. The method of claim 19, further comprising detecting the combined LADAR signals.

23. The method of claim 19, further comprising:
    splitting multiplexed LADAR signal; and
    detecting the split multiplexed LADAR signal.

24. The method of claim 9, further comprising switching the multiplexed LADAR signal between a first and a second detector.

25. The method of claim 19, further comprising attenuating the multiplexed LADAR signal.

26. A LADAR apparatus, comprising:
    means for receiving a plurality of LADAR signals;
    means for time domain multiplexing the received LADAR signals into a multiplexed LADAR signal, including:
        means for inserting a unique, staggered delay into each of the LADAR signals, including:
            means for propagating the received LADAR signals over varied distances; and
            means for circulating the LADAR signals to a respective reflector and back through a lens; and means for combining the delayed LADAR signals;
means for detecting the multiplexed LADAR signal; and
means for demultiplexing the detected LADAR signal.

27. The LADAR apparatus of claim 26, wherein the combining means includes one of a tree coupler or a cascade of tap couplers.

28. The LADAR apparatus of claim 26, wherein the wherein the combining means includes means for focusing the delayed LADAR signals onto the active surface of the optical detector.

29. The LADAR apparatus of claim 26, further comprising means for detecting the combined LADAR signals.

30. The LADAR apparatus of claim 26, further comprising:
means for splitting multiplexed LADAR signal; and
means for detecting the split multiplexed LADAR signal.

31. The LADAR apparatus of claim 26, further comprising means for switching the multiplexed LADAR signal between a first and a second detector.

32. The LADAR apparatus of claim 26, further comprising means for attenuating the multiplexed LADAR signal.

33. The LADAR apparatus of claim 26, further comprising:
a second optical detector; and
a switch through which the second optical detector receives the multiplexed optical signal; and
a polarization splitter through which the second optical detector receives the multiplexed optical signal.

* * * * *

UNITED STATES PATENT AND TRADEMARK OFFICE
CERTIFICATE OF CORRECTION

PATENT NO. : 7,375,804 B2 Page 1 of 1
APPLICATION NO. : 11/069477
DATED : May 20, 2008
INVENTOR(S) : Lionel D. Liebman et al.

It is certified that error appears in the above-identified patent and that said Letters Patent is hereby corrected as shown below:

Col. 12, line 51: delete "9" and insert --19--

Col. 14, line 15: insert claim 34. --34. The LADAR apparatus of claim 16, wherein the directing means comprises a switch and a polarization splitter.--

Signed and Sealed this

Sixteenth Day of December, 2008

JON W. DUDAS
*Director of the United States Patent and Trademark Office*